United States Patent
Mishra et al.

(10) Patent No.: US 12,547,705 B2
(45) Date of Patent: Feb. 10, 2026

(54) SYSTEM/SUBSYSTEM ANOMALY DETECTION VIA SIMULATING END-TO-END DATA PROPAGATION

(71) Applicant: Dell Products L.P., Round Rock, TX (US)

(72) Inventors: Abhishek Mishra, Bangalore (IN); Anuj Chitalia, Mumbai (IN); Anusha N, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 18/427,936

(22) Filed: Jan. 31, 2024

(65) Prior Publication Data
US 2025/0245319 A1 Jul. 31, 2025

(51) Int. Cl.
*G06F 21/54* (2013.01)
*G06F 21/55* (2013.01)

(52) U.S. Cl.
CPC ............ *G06F 21/54* (2013.01); *G06F 21/552* (2013.01)

(58) Field of Classification Search
CPC .............................. G06F 21/54; G06F 21/552
USPC ............................................ 726/22; 709/223
See application file for complete search history.

(56) References Cited

U.S. PATENT DOCUMENTS

| | | | |
|---|---|---|---|
| 5,561,762 A * | 10/1996 | Smith ................. | G06F 11/2257 714/33 |
| 11,929,896 B1 * | 3/2024 | Shemesh ............... | H04L 41/122 |
| 12,057,993 B1 * | 8/2024 | Zafer .................. | H04L 41/0654 |
| 12,261,887 B2 * | 3/2025 | McCaig ............... | H04L 63/0227 |
| 2012/0240185 A1 * | 9/2012 | Kapoor ............... | H04L 41/0866 726/1 |
| 2016/0328114 A1 * | 11/2016 | Santhakumar .......... | G06F 9/452 |
| 2020/0294666 A1 * | 9/2020 | Stoilos .................... | H04L 51/02 |
| 2023/0267123 A1 * | 8/2023 | Basu .................... | G06F 16/2477 707/722 |

FOREIGN PATENT DOCUMENTS

WO      WO-2014197015 A1 * 12/2014 ........... H04L 65/403

* cited by examiner

*Primary Examiner* — Benjamin R Bruckart
(74) *Attorney, Agent, or Firm* — Krishnendu Gupta; Lesley Leonessa

(57) ABSTRACT

Methods, system, and non-transitory processor-readable storage medium for a web applications data flow simulation system are provided herein. An example method includes a web applications data flow simulation system that detects an event in a source web application, where a plurality of web applications comprises the source web application. The web applications data flow simulation system tracks propagation of data between the plurality of web applications in response to the event, to create a data propagation chain comprising a plurality of JavaScript Object Notation (JSON) objects in a JSON object array. The web applications data flow simulation system reports to the source web application an anomaly detected in the plurality of web applications caused by the event.

16 Claims, 10 Drawing Sheets

SYSTEM/SUBSYSTEM ANOMALY DETECTION VIA SIMULATING END-TO-END DATA PROPAGATION

FIELD

The field relates generally to web applications, and more particularly to simulating end-to-end data propagation in web applications in information processing systems.

BACKGROUND

Once a web application is released to production, it generally undergoes continuing enhancements and bug fixes. These enhancements and/or bug fixes can involve an update to the front-end or back-end, or a change on the interface. Sometimes, the impact of these enhancements and/or bug fixes is not localized, and instead effects a downstream system. Increasing the testing coverage with real time data increases the probability of uncovering defects.

SUMMARY

Illustrative embodiments provide techniques for implementing a web applications data flow simulation system in a storage system. For example, illustrative embodiments provide a web applications data flow simulation system that detects an event in a source web application, where a plurality of web applications comprises the source web application. The web applications data flow simulation system tracks propagation of data between the plurality of web applications in response to the event, to create a data propagation chain comprising a plurality of JavaScript Object Notation (JSON) objects in a JSON object array. The web applications data flow simulation system reports to the source web application an anomaly detected in the plurality of web applications caused by the event. Other types of processing devices can be used in other embodiments. These and other illustrative embodiments include, without limitation, apparatus, systems, methods and processor-readable storage media.

DETAILED DESCRIPTION

Figure 1:
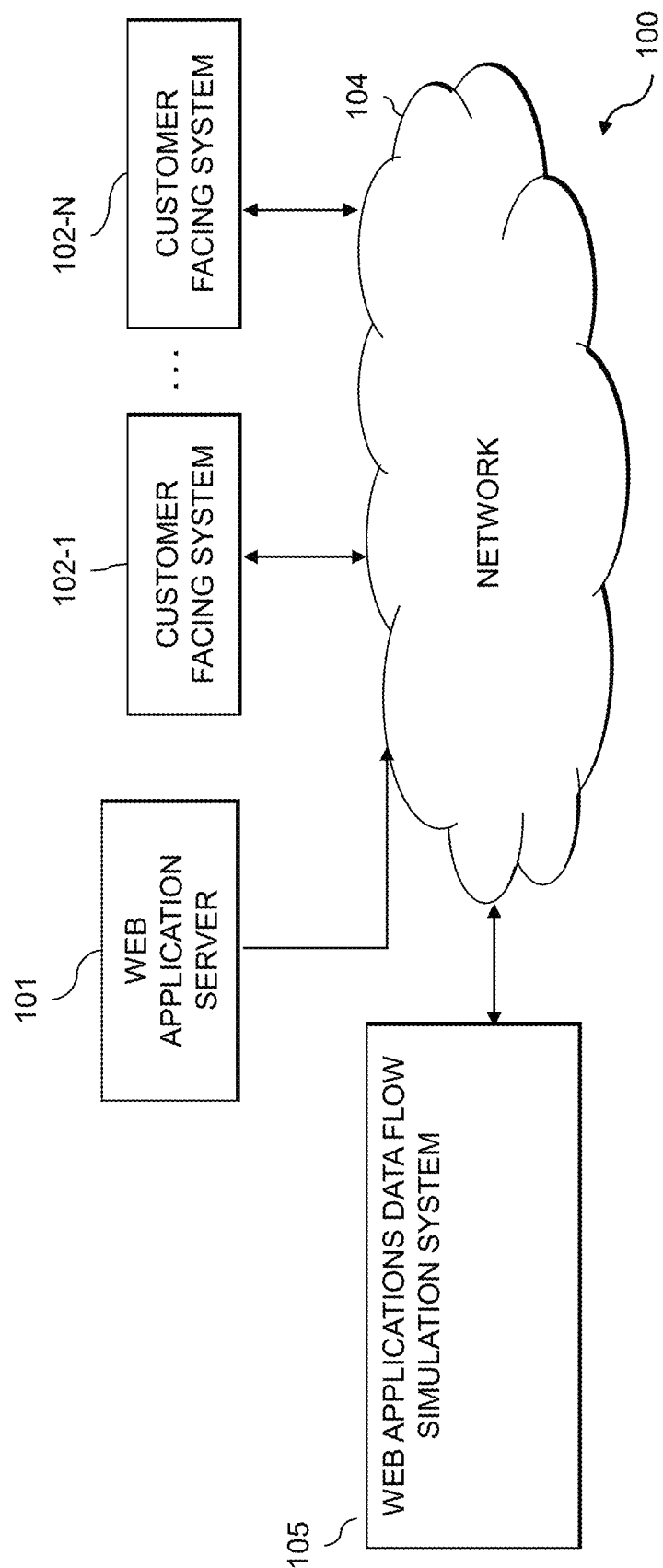
FIG. 1 shows an information processing system including a web applications data flow simulation system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a web applications data flow simulation system, which technique may be used to provide, among other things capturing data flow from a source system to a destination system, including the propagation of data from the source system to the destination system. The web applications data flow simulation system detects an event in a source web application, where a plurality of web applications comprises the source web application. The web applications data flow simulation system tracks propagation of data between the plurality of web applications in response to the event, to create a data propagation chain comprising a plurality of JavaScript Object Notation (JSON) objects in a JSON object array. The web applications data flow simulation system reports to the source web application an anomaly detected in the plurality of web applications caused by the event. Other types of processing devices can be used in other embodiments.

Development of web applications include many enhancements with every sprint/release. Web applications with rich, layered user interfaces with thousands of user interface (UI) elements require updates in the test scripts that test these elements. These updates to the test scripts increase the maintenance of automation test suites which are prone to human errors, omitting test coverage, and increasing the overhead of cost and the time required to update the test scripts. In a complex system with multiple interconnected web applications, it can be difficult to identify where issues are occurring, or where data is being lost. By capturing webhook logs or message exchanges, developers can pinpoint the source of issues and debug the system more efficiently.

Conventional technologies focus on covering each functionality of the web application irrespective of their scale of usage in production, leading to over testing of some areas while other areas with a high scale of usage in production are left untested. Conventional technologies fail to focus testing on maximum business risk coverage. Conventional technologies for generating test data do not intercept user actions and obtain real time test data from Application Programming Interface (API) calls. Conventional technologies do not provide a "data flow meter" that measures the flow of data at each junction between web applications, that can help identify where data is being delayed, lost, or corrupted, nor do conventional technologies provide insights into the overall performance and health of the system. Conventional technologies do not provide a system that captures webhook and/or message exchanges that can help developers diagnose and fix issues in a complex web application system. Conventional technologies fail to provide real time data for testing and detecting anomalies on a production replicated production/staging environment to increase the business risk coverage and early detection of defects. Conventional technologies fail to provide a real time end-to-end data propagation chain that can be used to simulate the data propagating end to end among web applications in a system. Conventional technologies fail to provide a real time data propagation chain that helps testing teams increase test coverage with real time use cases, enables those teams to perform testing with real time test data, and improve customer satisfaction. Conventional technologies fail to detect anomalies on the pre-production web application sub-systems of a multi-web application environment. Conventional technologies fail to provide end-to-end data propagation monitoring as a service, where users can register APIs and access the monitoring capabilities. Conventional technologies fail to provide scalability to monitor an increasing number of interconnected web applications and ensuing data flow increases. Conventional technologies fail to normalize and categorize API call sequences, which, in turn reduce redundancies, and organize data efficiently for analysis.

By contrast, in at least some implementations in accordance with the current technique as described herein, a web applications data flow simulation system detects an event in a source web application, where a plurality of web applications comprises the source web application. The web applications data flow simulation system tracks propagation of data between the plurality of web applications in response to the event, to create a data propagation chain comprising a plurality of JavaScript Object Notation (JSON) objects in a JSON object array. The web applications data flow simulation system reports to the source web application an anomaly detected in the plurality of web applications caused by the event.

Thus, a goal of the current technique is to provide a method and a system for a "data flow meter" that measures the flow of data at each junction between web applications, that can help identify where data is being delayed, lost, or corrupted, and provide insights into the overall performance and health of the system. Another goal is to provide a system that captures webhook and/or message exchanges that can help developers diagnose and fix issues in a complex web application system. Another goal is to provide real time data for testing and detecting anomalies on a production replicated production/staging environment, to increase the business risk coverage and early detection of defects. Another goal is to provide a real time end-to-end data propagation chain that can be used to simulate the data propagating end to end among web applications in a system. Another goal is to provide a real time data propagation chain that helps testing teams increase test coverage with real time use cases, enables those teams to perform testing with real time test data, and improve customer satisfaction. Another goal is to detect anomalies on the pre-production web application sub-systems of a multi-web application environment. Another goal is to provide end-to-end data propagation monitoring as a service, where users can register APIs and access the monitoring capabilities. Another goal is to provide scalability to monitor an increasing number of interconnected web applications and ensuing data flow increases. Yet another goal is to normalize and categorize API call sequences, which, in turn reduce redundancies, and organize data efficiently for analysis.

In at least some implementations in accordance with the current technique described herein, the use of a web applications data flow simulation system can provide one or more of the following advantages: provide a "data flow meter" that measures the flow of data at each junction between web applications, that can help identify where data is being delayed, lost, or corrupted, provide insights into the overall performance and health of the system, provide a system that captures webhook and/or message exchanges that can help developers diagnose and fix issues in a complex web application system, provide real time data for testing and detecting anomalies on a production replicated production/staging environment, to increase the business risk coverage and early detection of defects, provide a real time end-to-end data propagation chain that can be used to simulate the data propagating end to end among web applications in a system, provide a real time data propagation chain that helps testing teams increase test coverage with real time use cases, enables those teams to perform testing with real time test data, and improve customer satisfaction, detect anomalies on the pre-production web application sub-systems of a multi-web application environment, provide end-to-end data propagation monitoring as a service, where users can register APIs and access the monitoring capabilities, and provide scalability to monitor an increasing number of interconnected web applications and ensuing data flow increases, and normalize and categorize API call sequences, which, in turn reduce redundancies, and organize data efficiently for analysis.

In contrast to conventional technologies, in at least some implementations in accordance with the current technique as described herein, a web applications data flow simulation system detects an event in a source web application, where a plurality of web applications comprises the source web application. The web applications data flow simulation system tracks propagation of data between the plurality of web applications in response to the event, to create a data propagation chain comprising a plurality of JavaScript Object Notation (JSON) objects in a JSON object array. The web applications data flow simulation system reports to the source web application an anomaly detected in the plurality of web applications caused by the event.

In an example embodiment of the current technique, a trigger module triggers an Application Programming Interface (API) call sequence associated with the data propagation chain to simulate propagation of the data between the plurality of web applications in response to the event, captures anomalies detected during the API call sequence, and generates a report detailing information associated with the detected anomalies.

In an example embodiment of the current technique, an interceptor module intercepts a call sequence associated with the event, from the plurality of web applications.

In an example embodiment of the current technique, the interceptor module retrieves data associated with the event, where the event triggers the data in at least one of the plurality of web applications, where the web applications data flow simulation system comprises the interceptor module, and where the interceptor module receives the data from middleware.

In an example embodiment of the current technique, the middleware comprises at least one of a webhook and a message broker.

In an example embodiment of the current technique, the data comprises at least one of event data, object data, and custom data.

In an example embodiment of the current technique, the interceptor module retrieves the data associated with the event using payload parsing.

In an example embodiment of the current technique, the interceptor module stores the data associated with the event in the JSON object array.

In an example embodiment of the current technique, a sequencer module creates the JSON object array in response to detecting the event, where the JSON object array comprises the plurality of JSON objects.

In an example embodiment of the current technique, the sequencer module identifies duplicate JSON objects in the JSON object array, and deduplicates the JSON object array.

In an example embodiment of the current technique, the sequencer module iterates through each JSON object in the JSON object array to identify a duplicate JSON object based on a criterion associated with the duplicate JSON object, and eliminates the duplicate JSON object from the JSON object array.

In an example embodiment of the current technique, an analyzer module categorizes the JSON object array according to a source of an application trigger.

In an example embodiment of the current technique, the analyzer module identifies an origination location associated with the event, where the event occurred in the source web application at the origination location, and where the origination location is the source of the application trigger.

In an example embodiment of the current technique, the analyzer module determines a chronological order of a plurality of events resulting from the event that occurred in the source web application, where the plurality of events comprises the event that occurred in the source web application.

In an example embodiment of the current technique, the chronological order is determined utilizing event details and API Universal Resource Locator (URL) information from the JSON object array.

In an example embodiment of the current technique, the analyzer module creates a node to represent each of the respective plurality of events, where each node comprises API URL information and an argument list.

In an example embodiment of the current technique, the analyzer module creates a graph comprising a plurality of nodes, where each node represents each of the plurality of events, where the plurality of events is chronologically ordered.

In an example embodiment of the current technique, a consolidator module optimizes the graph to remove duplicates nodes, where the optimized graph is associated with the data propagation chain.

In an example embodiment of the current technique, the web applications data flow simulation system detects an exception in a web application of the plurality of web applications, where the exception is caused by the event, a trigger module reports the exception to the source web application.

FIG. 1 shows a computer network (also referred to herein as an information processing system) 100 configured in accordance with an illustrative embodiment. The computer network 100 comprises a web application server 101, web applications data flow simulation system 105, and customer facing systems 102-N. The web application server 101, web applications data flow simulation system 105, and customer facing systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. The web applications data flow simulation system 105 may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the customer facing systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The customer facing systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the web applications data flow simulation system 105 are one or more input-output devices, which illustratively comprise keyboards, displays or other types of input-output devices in any combination. Such input-output devices can be used, for example, to support one or more user interfaces to the web applications data flow simulation system 105, as well as to support communication between the web applications data flow simulation system 105 and other related systems and devices not explicitly shown. For example, a dashboard may be provided for a user to view a progression of the execution of the web applications data flow simulation system 105. One or more input-output devices may also be associated with any of the customer facing systems 102-N.

Additionally, the web applications data flow simulation system 105 in the FIG. 1 embodiment is assumed to be implemented using at least one processing device. Each such processing device generally comprises at least one processor and an associated memory, and implements one or more functional modules for controlling certain features of the web applications data flow simulation system 105.

More particularly, the web applications data flow simulation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the web applications data flow simulation system 105 to communicate over the network 104 with the web application server 101, and customer facing systems 102-N and illustratively comprises one or more conventional transceivers.

A web applications data flow simulation system 105 may be implemented at least in part in the form of software that is stored in memory and executed by a processor, and may reside in any processing device. The web applications data flow simulation system 105 may be a standalone plugin that may be included within a processing device.

It is to be understood that the particular set of elements shown in FIG. 1 for web applications data flow simulation system 105 involving the web application server 101, and customer facing systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the web applications data flow simulation system 105 can be on and/or part of the same processing platform.

Figure 2:
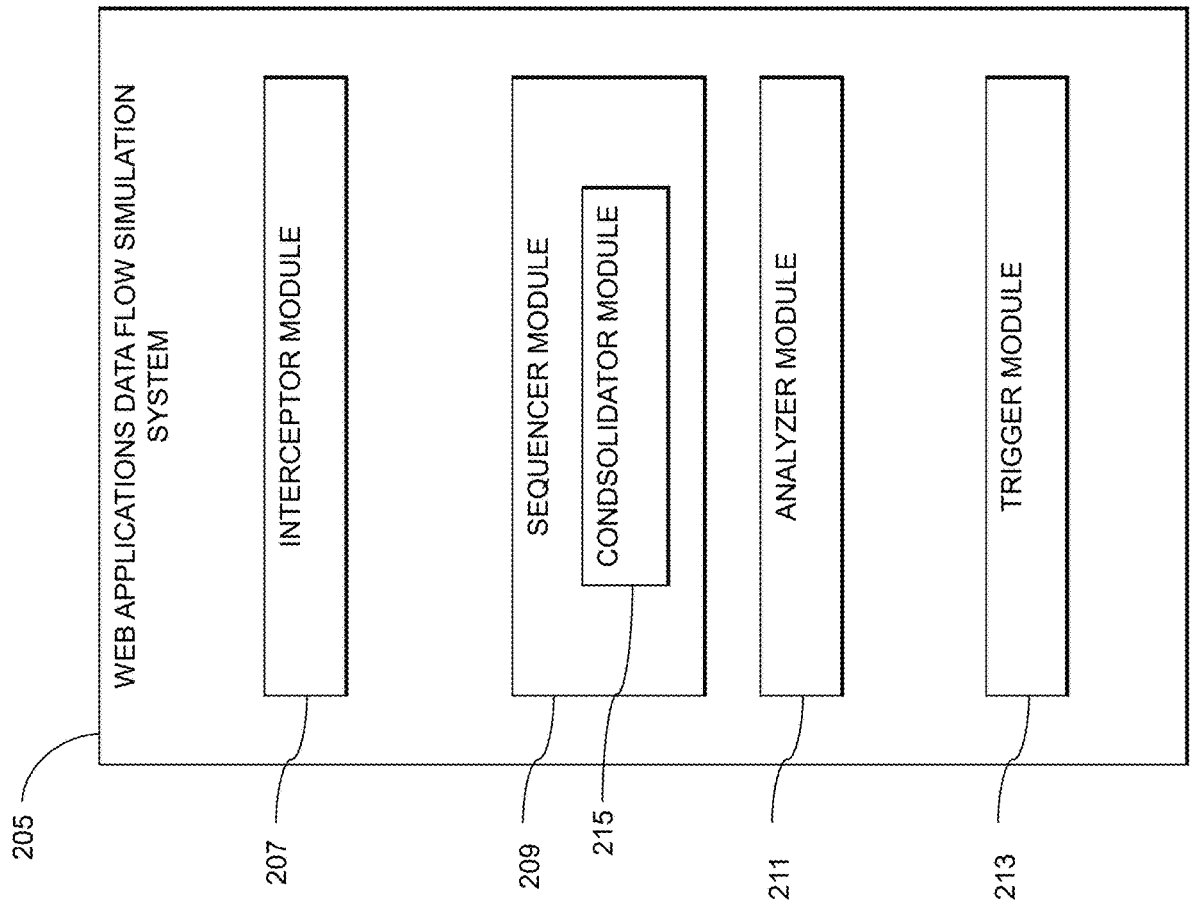
FIG. 2 shows a web applications data flow simulation system in an illustrative embodiment.

FIG. 2 shows a web applications data flow simulation system 205 in an illustrative embodiment. In an example embodiment, the web applications data flow simulation system 205 comprises the interceptor module 207, sequencer module 209, analyzer module 211, and trigger module 213. The sequencer module 209 comprises the consolidator module 215.

Figure 3:
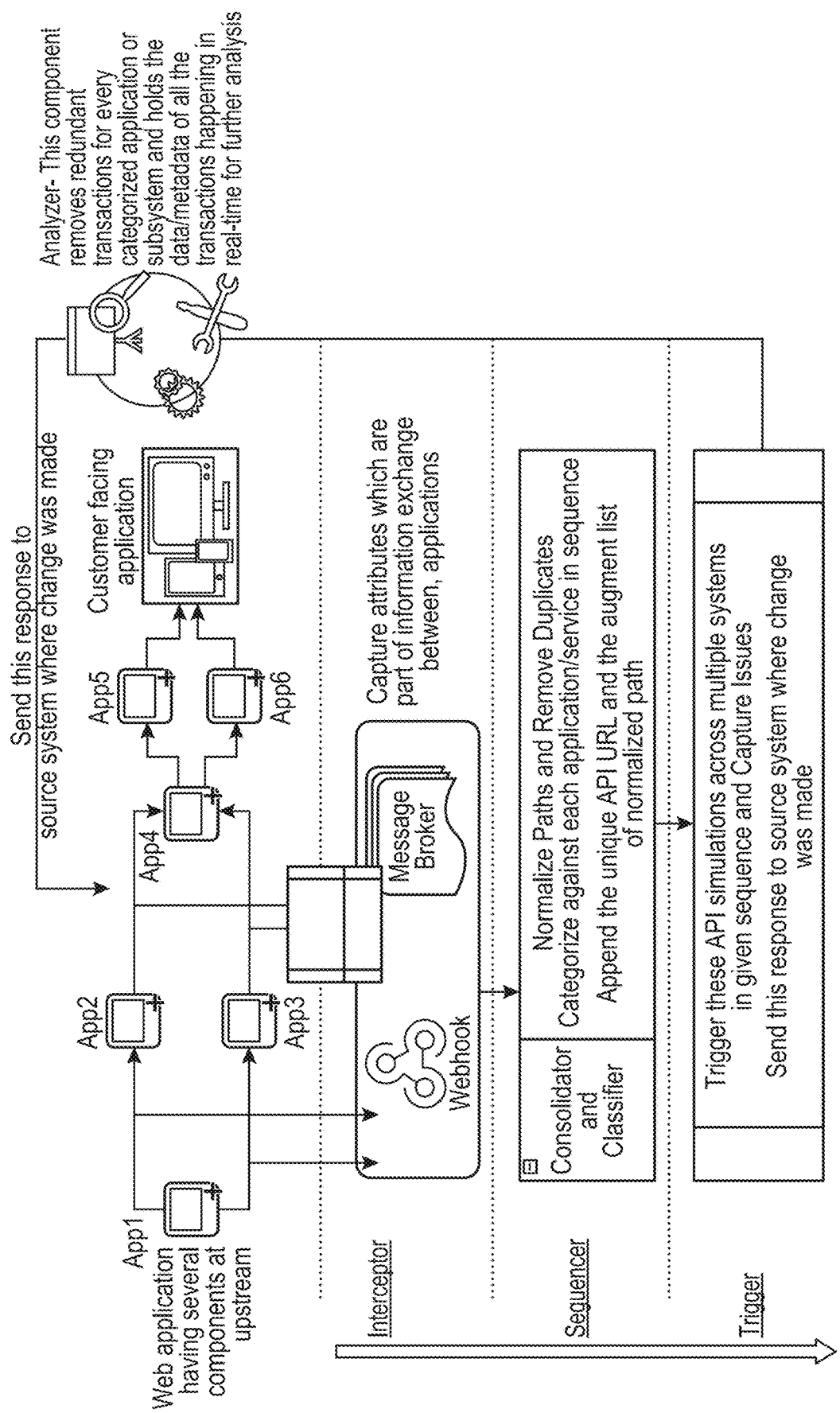
FIG. 3 shows an architectural diagram of the web applications data flow simulation system in an illustrative embodiment.

FIG. 3 shows an architectural diagram of the web applications data flow simulation system in an illustrative embodiment. In an example embodiment, the web application data flow simulation system 105 is offered as a service. Users may register their APIs to access the monitoring capabilities, thus eliminating the need for complex installations and maintenance. In an example embodiment, the web application data flow simulation system 105 provides scalability in handling growing volume of data and increasing user demands. As the number of interconnected web applications increases, and thus, the data flow increases, the web application data flow simulation system 105 efficiently accommodates and processes the additional load without sacrificing performance or reliability. In an example embodiment, the web application data flow simulation system 105 is adaptable to changing environments and can adjust and perform optimally in dynamic conditions. As the web application landscape changes with new APIs, web application sub-systems, or data sources, the web application data flow simulation system 105 seamlessly adapts to these changes, without requiring significant modifications or disruptions. Additionally, the web application data flow simulation system 105 helps to detect and prevent security threats by monitoring system logs and network traffic, improving the security posture and preventing data breaches.

In an example embodiment, the interceptor module 207 comprises middleware comprising webhooks and a message broker. In an example embodiment, the interceptor module 207 captures webhook logs and messages exchanges from interconnected web applications. In an example embodiment, the middleware captures and records data and metadata, such as event time and time, related to an event triggered in a source web application sub-system. A web application (i.e., the source web application sub-system) in which an event occurs is one of a plurality of web applications. In an example embodiment, the plurality of web applications comprises the web application and web application sub-systems, where the web application sub-systems are downstream from the web application. In an example embodiment, the event that occurs in the web application triggers a second event in one of the web application sub-systems (i.e., an intermediate web application sub-system), which, in turn, triggers a third event in another one of the web application sub-systems. In an example embodiment, the interceptor module 207 retrieves data from the webhook, and tracks the propagation of the data between the multiple web application sub-systems in the plurality of web applications.

In an example embodiment, the sequencer module 209 normalizes the API call sequences between web application sub-systems, removing redundancies, and categorizes the data based on web applications. In an example embodiment, the sequencer module 209 determines the sequence of the event triggering the second event, which, in turn, triggers the third event to create a chain of API call sequences (i.e., the data propagation chain). In an example embodiment, the sequencer module 209 consolidates and classifies the data captured by the interceptor module 207. In an example embodiment, not every API call sequence contributes to the detection of an anomaly resulting from the event. Thus, the sequencer module 209 normalizes the chain of API call sequences between the web application sub-systems and removes any redundant data. In an example embodiment, the sequencer module 209 further categories the data flowing between multiple web application sub-systems based on application.

In an example embodiment, the analyzer module 211 holds the data and metadata in real time, and continuously monitors the data flow. In an example embodiment, the analyzer module 211 removes redundant transactions, and prepares the data for further analysis. In an example embodiment, the analyzer module 211 removes redundant transactions for every categorized web application sub-system. In an example embodiment, the analyzer module 211 maintains the data and/or metadata of all the transactions happening at any level in real-time. In an example embodiment, the analyzer module 211 maintains the transactions for further analysis.

In an example embodiment, the trigger module 213 simulates the flow of the data propagation chain by triggering the API call sequence, and then captures any issues that occur. In an example embodiment, the trigger module 213 allows the web application data flow simulation system 105 to establish a baseline of normal behavior by analyzing historical data and transaction patterns during normal operations. By comparing real time data to the established baseline, the analyzer module 211 detects deviations, such as unusual delays, errors, and/or unexpected data flow, which may indicate potential anomalies. Once an anomaly is detected, the web application data flow simulation system 105 generates alerts or notifications for administrators and/or developers. The web application data flow simulation system 105 provides detailed reports comprising call sequences, API URLs, argument lists, and web application sub-systems involved in the detected anomalies. In an example embodiment, the trigger module 213 generates a report comprising the call sequence, API URL and argument list information, along with the web application sub-systems through which the call sequence propagated. Thus, the web application data flow simulation system 105 efficiently detects anomalies in the flow of data between interconnected web applications, enabling developers to pinpoint issues, optimize performance, and ensure the overall health of the web application system.

Figure 4:
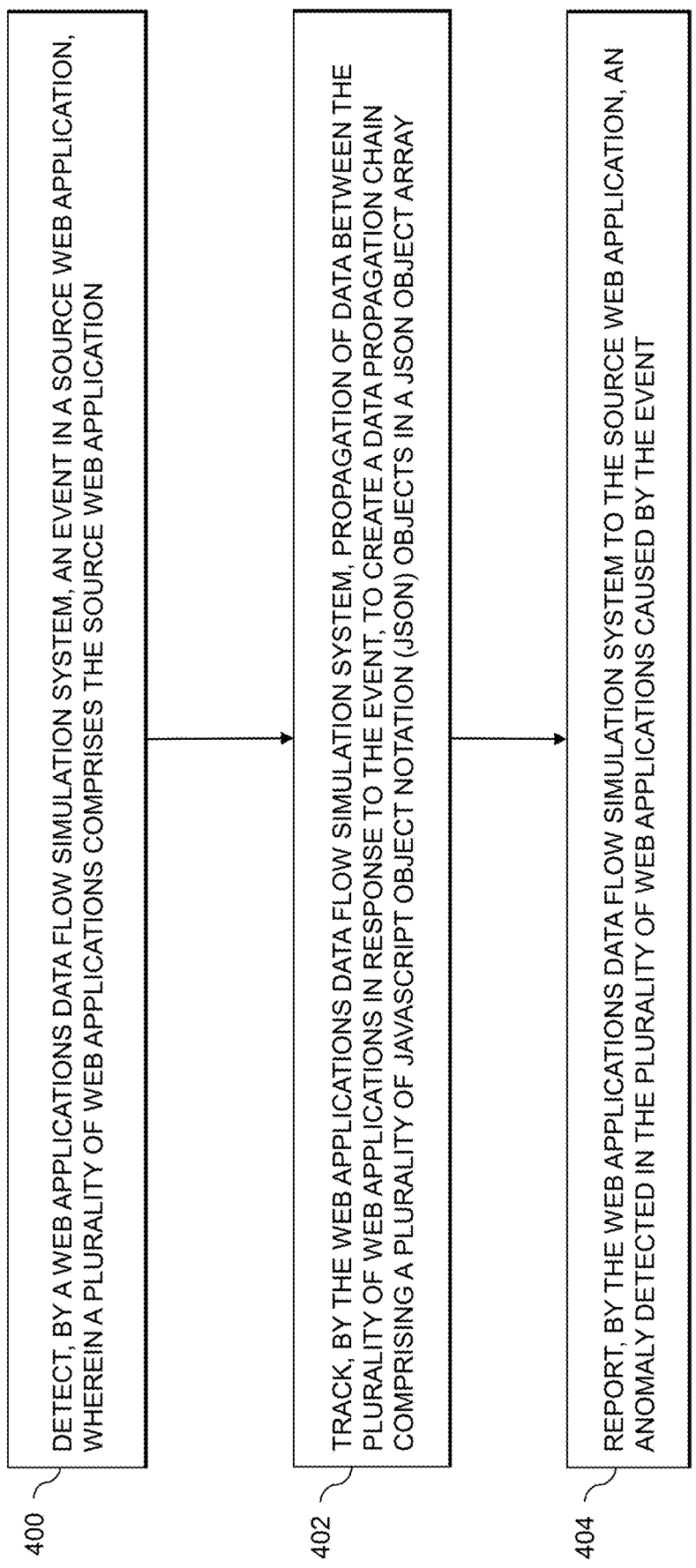
FIG. 4 shows a flow diagram of a process for a web applications data flow simulation system in an illustrative embodiment.

FIG. 4 is a flow diagram of a process for execution of the web applications data flow simulation system 105 in an illustrative embodiment. It is to be understood that this particular process is only an example, and additional or alternative processes can be carried out in other embodiments.

Figure 8:
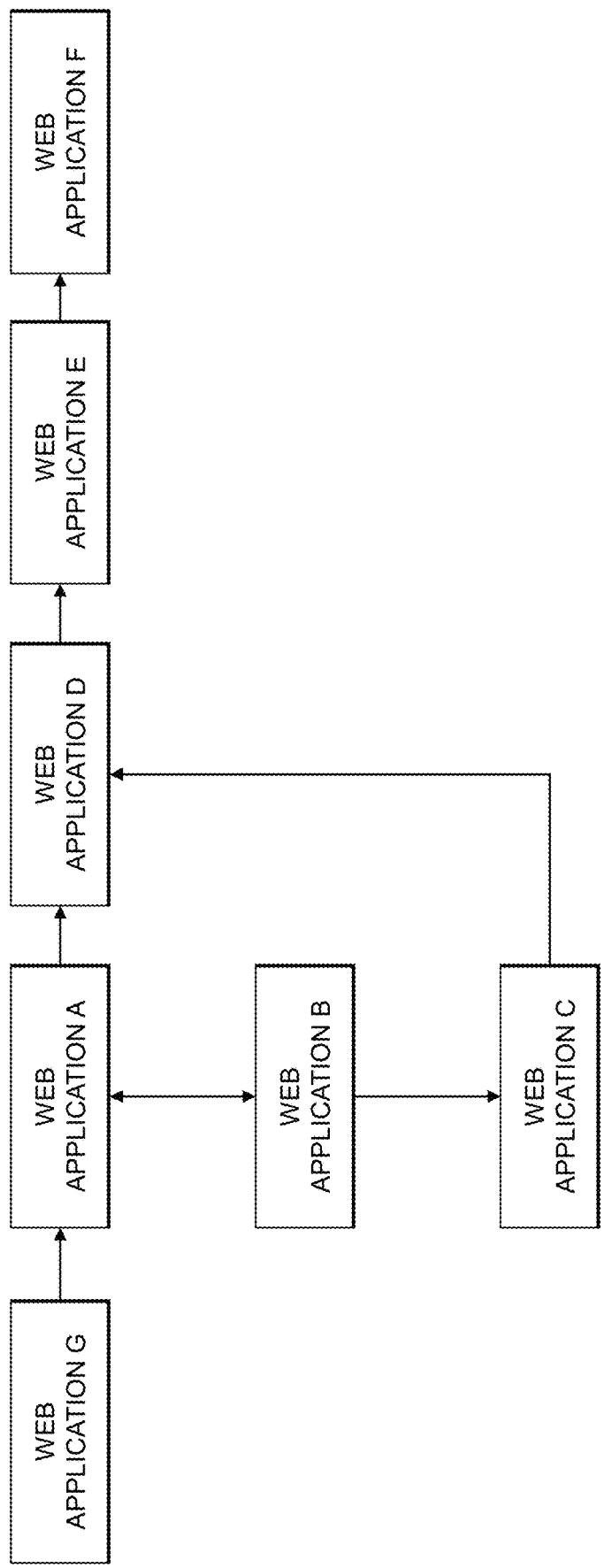
FIG. 8 illustrates a plurality of interconnected web applications in an illustrative embodiment.

At 400, the web application data flow simulation system 105 detects an event in a source web application, where a plurality of web applications comprises the source web application. FIG. 8 illustrates a plurality of interconnected web applications, web applications A through G. In an example embodiment, while the source web application is executing, an event is triggered. For example, in a plurality of web applications handling customer orders, a change in the "weight" attribute of a stock-keeping unit (SKU) in a source web application A impacts all the orders which include the SKU. A change in the SKU also affects other web application sub-systems that consume the SKU. Generally, there are multiple web applications running in the background having functionality for SKU management, pricing, order codes, etc. Updates to any of these applications may have a direct impact on the customer facing application, such as web application F. Web applications D, E, F, and G are all upstream web applications and/or systems. The data flow between the web applications A through G is indicated by the arrows in FIG. 8. Thus, the web application data flow simulation system 105 detects the change in the weight attribute of the SKU (i.e., "the event"). Web application F may not directly be using/showing the SKU for the user (of the customer facing web application F), but the SKU is consumed by other web applications B, D, and E. The pricing of the SKU is performed in web application B, and may impact the actual price on web application D, and eventually on web application F. In this example scenario, the pricing that appears on web application F may be unrealistic. This unrealistic data causes an error on web application F, and is detected by the web application data flow simulation system 105.

In an example embodiment, the interceptor module 207 intercepts a call sequence associated with the event, from the plurality of web applications. In an example embodiment, the interceptor module 207 uses middleware, such as webhooks or a message broker, to intercept the call sequence from the upstream web applications. For example, when the SKU attribute "weight" is changed in a first web application, the webhook triggers to notify the first web application's downstream application (i.e., "second web application"). In an example embodiment, the webhook sends a JSON payload to the second web application server with, for example, the following webhook request:

```
POST /updateSkuPricing/edit HTTP/1.1
Host: SecondWebApplication.pricing.com
Content-Type: application/json
{
   "SKU": "580-AOEH",
   "SKU Description": "1TB Mem,CXO",
   "Display Status": "show",
   "Gedis Class":"Informational",
   "Order Management":
   {
       "Discountable?": "Yes",
       "Recurred Billing Eligible": "No"
   },
   "Tax & Shipping":
   {
   "Weight":0.019,
   "Sabrix Tax Code":"97985 Gift Certificates"
   },
}
```

In an example embodiment, the second web application response with a "200" status code indicating success. For example, the webhook response may be as follows:
HTTP/1.1 200 OK In an example embodiment, the interceptor module 207 retrieves data associated with the event, where the event triggers the data in at least one of the plurality of web applications. In an example embodiment, the data comprises at least one of event data, object data, and custom data. In an example embodiment, the interceptor module 207 receives the data from middleware, where the middleware comprises at least one of a webhook and a message broker. In an example embodiment, receipt of the webhook from the second web application may trigger another webhook of a third web application, and further cascading actions. Thus, the interceptor module 207 acts as middleware in the request/response processing pipeline between the web applications sub-systems.

In an example embodiment, the interceptor module 207 retrieves the data associated with the event using payload parsing. In an example embodiment, the interceptor module 207 retrieves information, such as event data, object data, and customer data using the payload parsing, as illustrated below:

```
import json
payload = # The payload data as a string
data = json.loads(payload
```

In an example embodiment, the interceptor module 207 stores the data associated with the event in the JSON object array.

In an example embodiment, the sequencer module 209 creates the JSON object array in response to detecting the event. The JSON object array comprises the plurality of JSON objects. In an example embodiment, the JSON object array contains the parsed payload data that the interceptor module 207 obtained using payload parsing, as explained above. In an example embodiment, the JSON object array also contains the event details collected from the webhook.

In an example embodiment, a JSON object is instantiated exclusively for initiated API calls within a web application to communicate with the web application's immediate web application sub-system. In an example embodiment, API calls confined within the web application will be excluded from consideration because they do not trigger events, and any issues/anomalies associated with the API calls confined within the web application are typically identified during functional or regression testing.

In an example embodiment, the sequencer module 209 identifies duplicate JSON objects in the JSON object array, and deduplicates the JSON object array. In an example embodiment, the sequencer module 209 iterates through each JSON object in the JSON object array to identify duplicate JSON objects based on a criterion associated with the duplicate JSON object, and eliminates the duplicate JSON object from the JSON object array. For example, the specific criterion may be property value.

At 402, the web application data flow simulation system 105 tracks propagation of data between the plurality of web applications in response to the event, to create a data propagation chain comprising a plurality of JavaScript Object Notation (JSON) objects in a JSON object array. In an example embodiment, the analyzer module 211 sorts and organizes the JSON objects into specific groups. In an example embodiment, the analyzer module 211 categorizes the JSON object array according to a source of an application trigger. In an example embodiment, the analyzer module 211 identifies an origination location associated with the event, where the event occurred in the source web application at the origination location, and where the origination location is the source of the application trigger.

In an example embodiment the analyzer module 211 determines a chronological order of a plurality of events resulting from the event that occurred in the source web application, where the plurality of events comprises the event that occurred in the source web application. In an example embodiment, the chronological order is determined utilizing event details and API Universal Resource Locator (URL) information from the JSON object array. The chronical order of the plurality of events needs to be preserved to track the propagation of data and create the data propagation chain.

Figure 5:
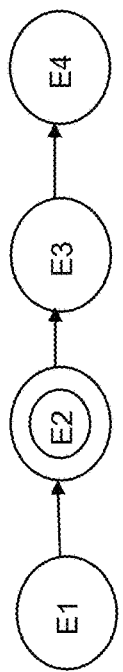
FIG. 5 shows example illustrations of the chronically ordered graphs created by the analyzer module in an illustrative embodiment.
Figure 5:
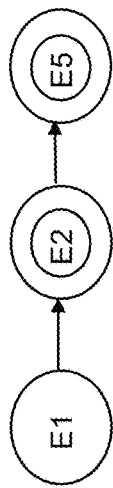
Figure 5:
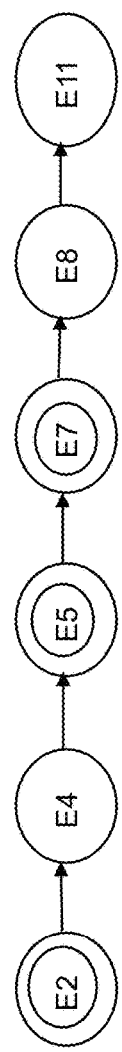

In an example embodiment, the analyzer module 211 creates a node to represent each of the respective plurality of events, where each node comprises API URL information and an argument list. In an example embodiment, the analyzer module 211 creates a graph comprising a plurality of nodes, where each node represents each of the plurality of events, and where the plurality of events is chronologically ordered. FIG. 5 shows example illustrations of the chronically ordered graphs (i.e., Graph 1, Graph 2, and Graph 3) created by the analyzer module 211. Graph 1 illustrates the trigger originated in web application 1. In Graph 1, E2 is the event triggered in web application 1, and E2 then triggers another event in Application 2, as illustrated in Graph 2. In Graph 2, E5 is the event triggered in web application 2 due to E2 of web application 1. The E5 event from upstream web application 2 triggers E7 in web application 3, as illustrated in Graph 3.

In an example embodiment, the consolidator module 215 optimizes the graph to remove duplicates nodes, where the optimized graph is associated with the data propagation chain.

Figure 6:
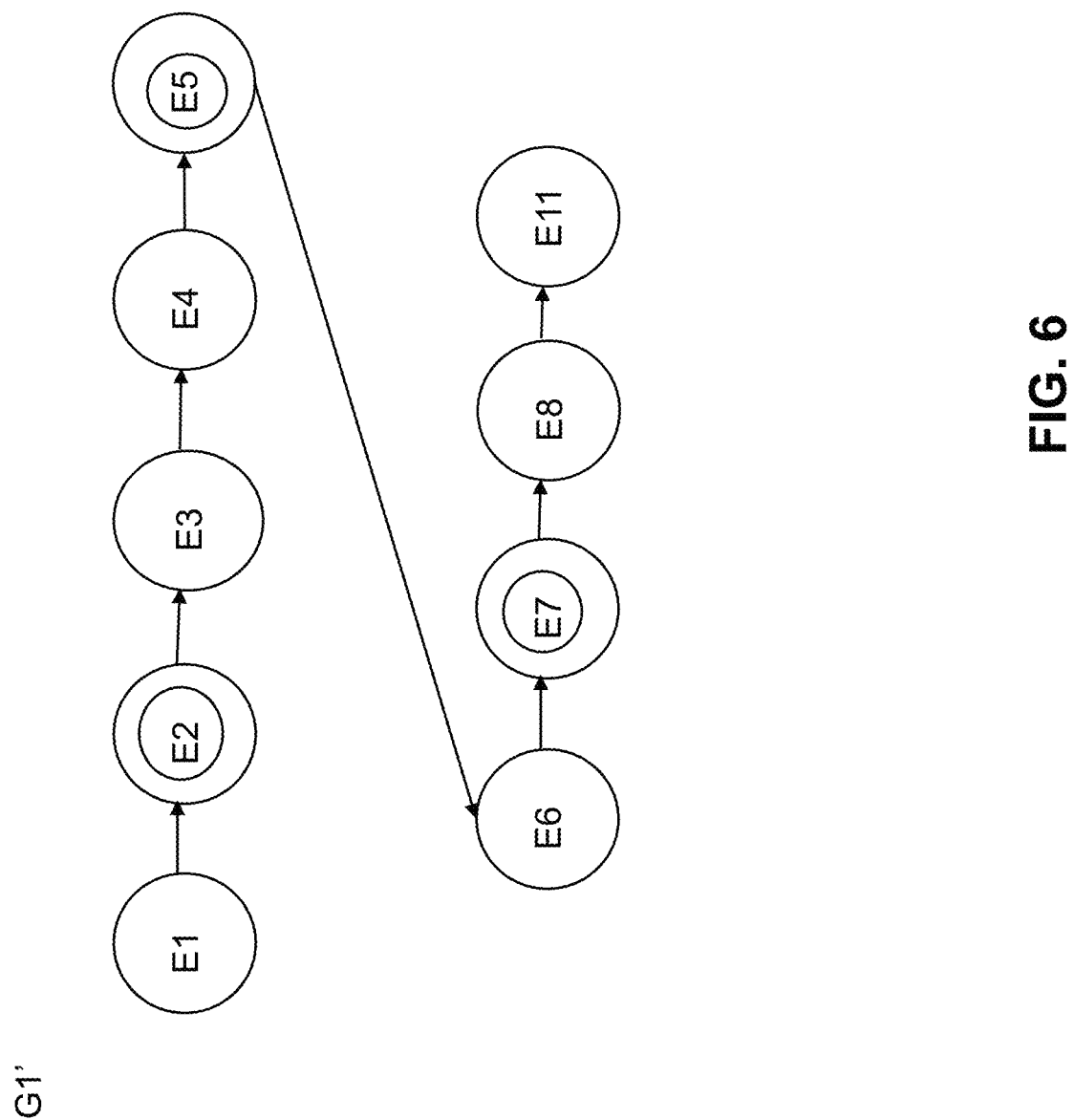
FIG. 6 illustrates a graph representing the normalized API call sequence between web application sub systems in an illustrative embodiment.
Figure 7:
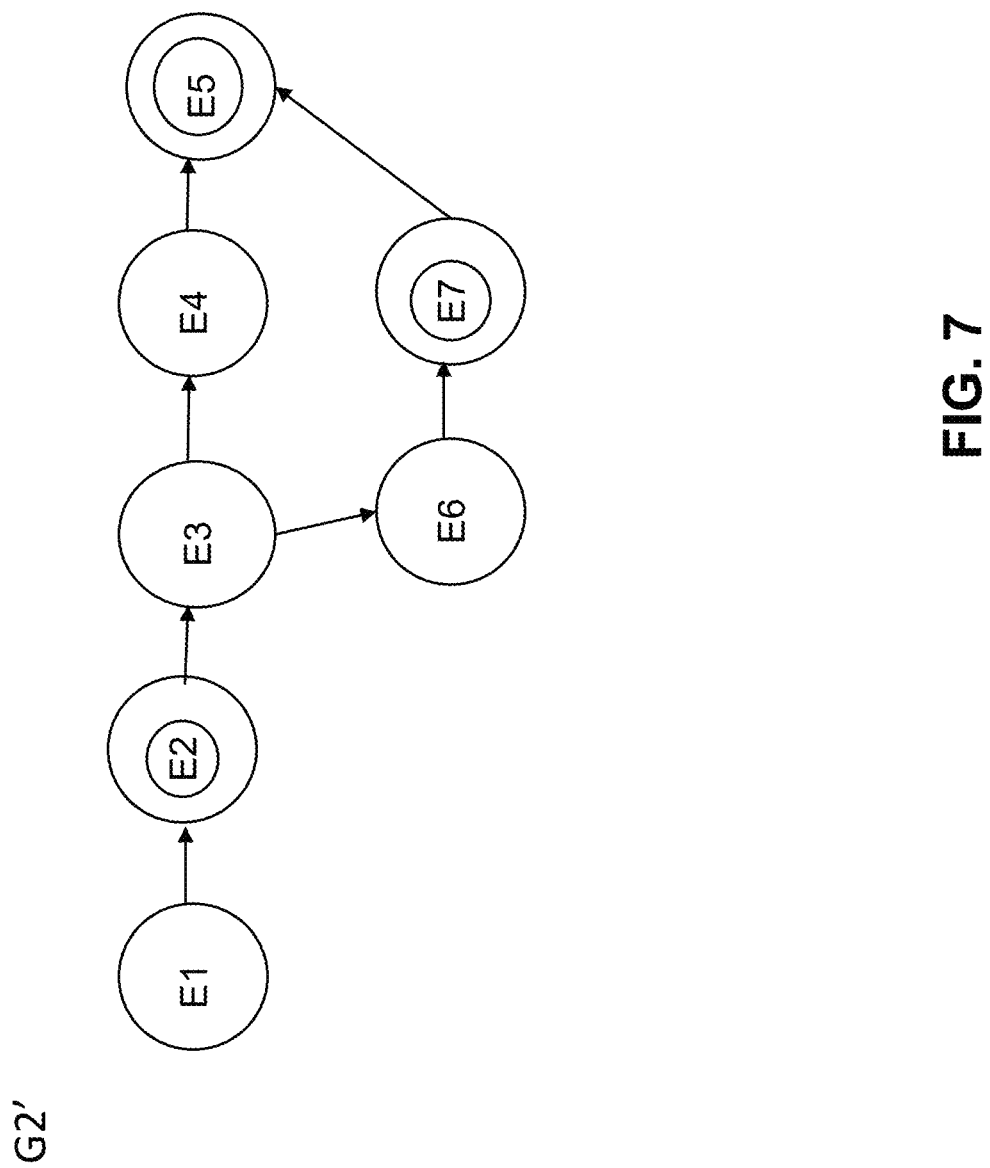
FIG. 7 illustrates an optimized graph representing the data propagation chain in an illustrative embodiment.

FIG. 6 illustrates graph G1' representing the normalized API call sequence between web application sub systems. In graph G1', events E8 and E11 are confined to the web applications sub-systems and do not initiate events in downstream systems. In an example embodiment, the consolidator module 215 optimizes the graph G1' to exclude E8 and E11. The resulting graph G2' is illustrated in FIG. 7. Graph G2' is the optimized graph that illustrates the data propagation chain encompassing all the events that have caused a domino effect by triggering subsequent events in the next web applications sub-systems.

At 404, the web application data flow simulation system 105 reports, to the source web application, an anomaly detected in the plurality of web applications caused by the event. In an example embodiment, the trigger module 213 detects an exception in a web application of the plurality of web applications, where the exception is caused by the event.

In an example embodiment, the web application data flow simulation system 105 identifies an exception in a downstream web application sub-system, and a notification is sent to the source web application where the change was the trigger that caused the exception. In an example embodiment, the trigger module 213 reports the exception to the source web application. For example, when the SKU attribute "weight" is changed in a first web application (i.e., the source web application), and an exception occurs in a downstream web application sub-system, a notification is sent to the first web application based on the data propagation chain created by the web application data flow simulation system 105 that indicates the trigger for the exception originated from the first web application.

In an example embodiment, the analyzer module 211 generates a log history and report that includes the call sequence, API URL, argument list information, and the web application sub-systems through which the call sequence propagated. The report may be used for further analysis to determine the root cause of the exception.

In an example embodiment, the trigger module 213 helps in initiating API calls for the call sequence at real-time during operations. In an example embodiment, the trigger module 213 triggers an API call sequence associated with the data propagation chain to simulate propagation of the data between the plurality of web applications in response to the event. In an example embodiment, the trigger module 213 captures anomalies detected during the API call sequence, and generates a report detailing information associated with the detected anomalies. In an example embodiment, the trigger module 213 enables users to replay the event chain. This allows users/developers to replay captured data, and simulate different scenarios for testing. This facilitates the generation of report, and enhances anomaly detection. The analyzer module 211 operates on data and metadata in real time when a user is making an actual transaction on a given web application. In an example embodiment, the web application data flow simulation system 105 provides a holistic view of data flow between interconnected web applications, providing a comprehensive and holistic approach to monitoring data flow between multiple interconnected web applications. The captured data propagation chain allows developers to trace the entire path of data propagation, and identify potential issues efficiently.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches.

For example, some embodiments are configured to provide a "data flow meter" that measures the flow of data at each junction between web applications, that can help identify where data is being delayed, lost, or corrupted, and provide insights into the overall performance and health of the system. These and other embodiments can effectively improve capturing real time data for testing and detecting anomalies on a production replicated production/staging environment, thereby increasing the business risk coverage and early detection of defects relative to conventional approaches. Embodiments disclosed herein provide a system that captures webhook and/or message exchanges that can help developers diagnose and fix issues in a complex web application system. Embodiments disclosed herein provide a real time end-to-end data propagation chain that can be used to simulate the data propagating end to end among web applications in a system. Embodiments disclosed herein provide a real time data propagation chain that helps testing teams increase test coverage with real time use cases, enables those teams to perform testing with real time test data, and improve customer satisfaction. Embodiments disclosed herein detect anomalies on the pre-production web application sub-systems of a multi-web application environment. Embodiments disclosed herein provide end-to-end data propagation monitoring as a service, where users can register APIs and access the monitoring capabilities. Embodiments disclosed herein provide scalability to monitor an increasing number of interconnected web applications and ensuing data flow increases. Embodiments disclosed herein normalize and categorize API call sequences, which, in turn reduce redundancies, and organize data efficiently for analysis.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of the information processing system 100, these platforms may also be used to implement at least portions of other information processing systems in other embodiments.

Figure 9:
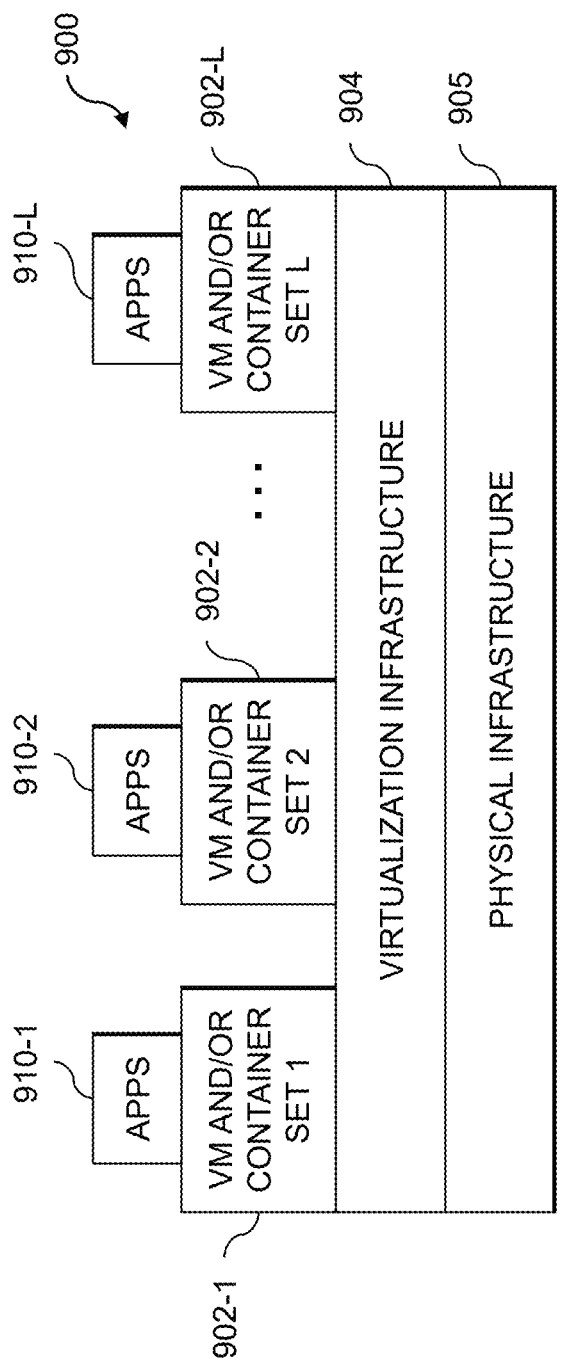
FIGS. 9 and 10 show examples of processing platforms that may be utilized to implement at least a portion of a web applications data flow simulation system embodiments.
Figure 10:
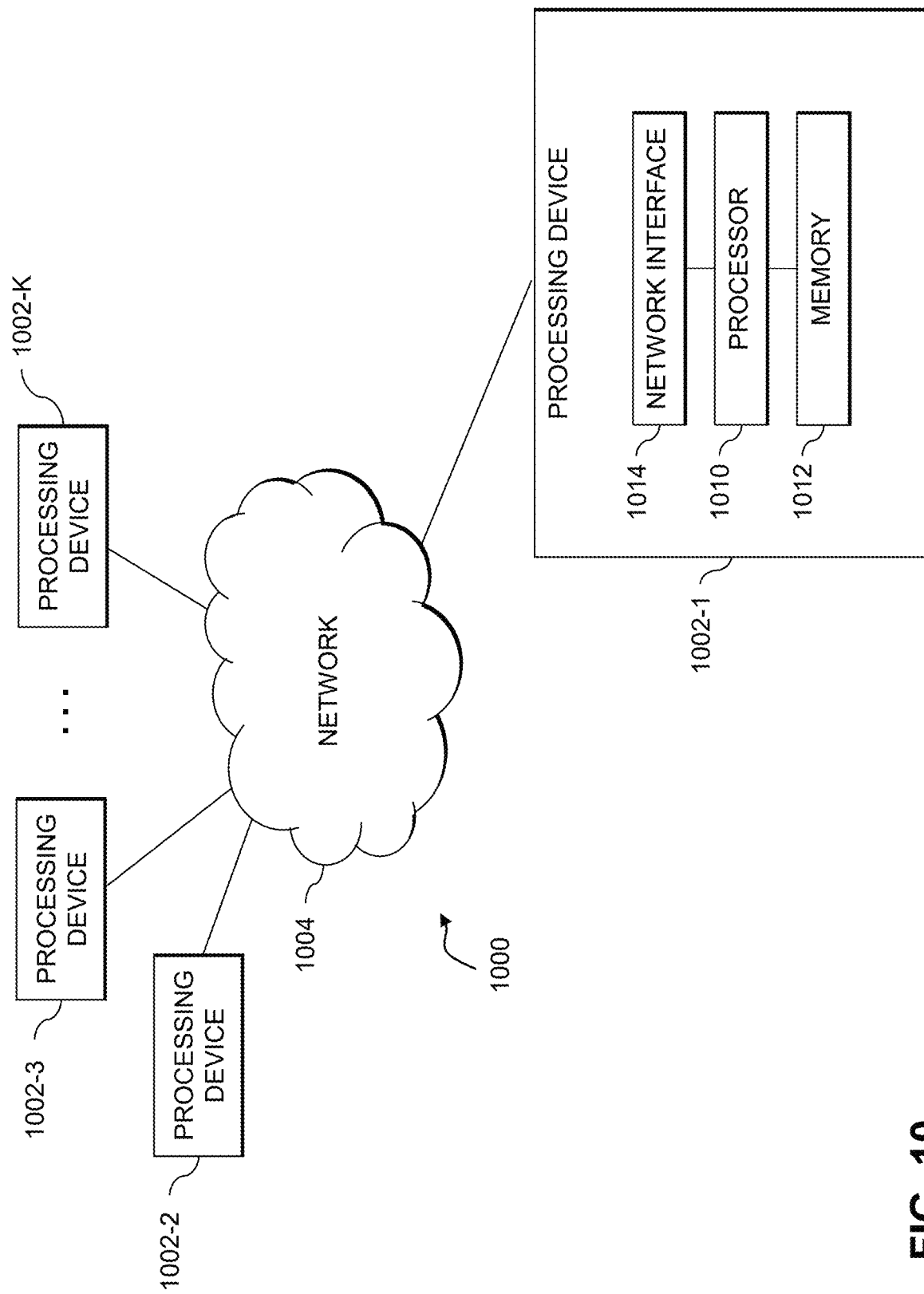

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, where the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of the information processing system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an application-specific integrated circuit (ASIC), a field-programmable gate array (FPGA) or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 804 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
  detecting, by a web applications data flow simulation system, an event in a source web application, wherein a plurality of web applications comprises the source web application;
  tracking, by the web applications data flow simulation system, propagation of data between the plurality of web applications in response to the event, to create a data propagation chain comprising a plurality of JavaScript Object Notation (JSON) objects in a JSON object array;
  categorizing, by an analyzer module, the JSON object array according to a source of an application trigger;
  determining a chronological order of a plurality of events resulting from the event that occurred in the source web application, wherein the plurality of events comprises the event that occurred in the source web application;
creating a node to represent each of the respective plurality of events, wherein each node comprises API URL information and an argument list;
creating a graph comprising a plurality of nodes, wherein each node represents each of the plurality of events, wherein the plurality of events is chronologically ordered;
optimizing the graph, by a consolidator module, to remove duplicate nodes, wherein the optimized graph is associated with the data propagation chain; and
reporting, by the web applications data flow simulation system to the source web application, an anomaly detected in the plurality of web applications caused by the event, wherein the method is performed by at least one processing device comprising a processor coupled to a memory.

2. The method of claim 1 further comprising:
triggering, by a trigger module, an Application Programming Interface (API) call sequence associated with the data propagation chain to simulate propagation of the data between the plurality of web applications in response to the event;
capturing anomalies detected during the API call sequence; and
generating a report detailing information associated with the detected anomalies.

3. The method of claim 1 wherein detecting, by a web applications data flow simulation system, an event in a source web application comprises:
intercepting, by an interceptor module, a call sequence associated with the event, from the plurality of web applications.

4. The method of claim 1 wherein detecting, by a web applications data flow simulation system, an event in a source web application comprises:
retrieving, by an interceptor module, data associated with the event, wherein the event triggers the data in at least one of the plurality of web applications, wherein the web applications data flow simulation system comprises the interceptor module, and wherein the interceptor module receives the data from middleware.

5. The method of claim 4 wherein the middleware comprises at least one of a webhook and a message broker.

6. The method of claim 4 wherein the data comprises at least one of event data, object data, and custom data.

7. The method of claim 4 wherein the interceptor module retrieves the data associated with the event using payload parsing.

8. The method of claim 1 wherein detecting, by a web applications data flow simulation system, an event in a source web application comprises:
storing, by the interceptor module, the data associated with the event in the JSON object array.

9. The method of claim 1 wherein detecting, by a web applications data flow simulation system, an event in a source web application comprises:
creating, by a sequencer module, the JSON object array in response to detecting the event, wherein the JSON object array comprises the plurality of JSON objects.

10. The method of claim 1 wherein detecting, by a web applications data flow simulation system, an event in a source web application comprises:
identifying, by a sequencer module, duplicate JSON objects in the JSON object array; and
deduplicating the JSON object array.

11. The method of claim 10 wherein deduplicating the JSON object array comprises:
iterating through each JSON object in the JSON object array to identify a duplicate JSON object based on a criterion associated with the duplicate JSON object; and
eliminating the duplicate JSON object from the JSON object array.

12. The method of claim 1 wherein categorizing, by an analyzer module, the JSON object array comprises:
identifying an origination location associated with the event, wherein the event occurred in the source web application at the origination location, wherein the origination location is the source of the application trigger.

13. The method of claim 1 wherein the chronological order is determined utilizing event details and API Universal Resource Locator (URL) information from the JSON object array.

14. The method of claim 1 wherein reporting, by the web applications data flow simulation system to the source web application, an anomaly detected in the plurality of web applications comprises:
detecting, by the web applications data flow simulation system, an exception in a web application of the plurality of web applications, wherein the exception is caused by the event; and
reporting, by a trigger module, the exception to the source web application.

15. A system comprising:
at least one processing device comprising a processor coupled to a memory;
the at least one processing device being configured:
to detect by a web applications data flow simulation system, an event in a source web application, wherein a plurality of web applications comprises the source web application;
to track, by the web applications data flow simulation system, propagation of data between the plurality of web applications in response to the event, to create a data propagation chain comprising a plurality of JavaScript Object Notation (JSON) objects in a JSON object array;
to categorize, by an analyzer module, the JSON object array according to a source of an application trigger;
to determine a chronological order of a plurality of events resulting from the event that occurred in the source web application, wherein the plurality of events comprises the event that occurred in the source web application;
to create a node to represent each of the respective plurality of events, wherein each node comprises API URL information and an argument list;
to create a graph comprising a plurality of nodes, wherein each node represents each of the plurality of events, wherein the plurality of events is chronologically ordered;
to optimize the graph, by a consolidator module, to remove duplicate nodes, wherein the optimized graph is associated with the data propagation chain; and
to report, by the web applications data flow simulation system to the source web application, an anomaly detected in the plurality of web applications caused by the event.

16. A computer program product comprising a non-transitory processor-readable storage medium having stored therein program code of one or more software programs, wherein the program code when executed by at least one processing device causes said at least one processing device:

- to detect by a web applications data flow simulation system, an event in a source web application, wherein a plurality of web applications comprises the source web application;
- to track, by the web applications data flow simulation system, propagation of data between the plurality of web applications in response to the event, to create a data propagation chain comprising a plurality of JavaScript Object Notation (JSON) objects in a JSON object array;
- to categorize, by an analyzer module, the JSON object array according to a source of an application trigger;
- to determine a chronological order of a plurality of events resulting from the event that occurred in the source web application, wherein the plurality of events comprises the event that occurred in the source web application;
- to create a node to represent each of the respective plurality of events, wherein each node comprises API URL information and an argument list;
- to create a graph comprising a plurality of nodes, wherein each node represents each of the plurality of events, wherein the plurality of events is chronologically ordered;
- to optimize the graph, by a consolidator module, to remove duplicate nodes, wherein the optimized graph is associated with the data propagation chain; and
- to report, by the web applications data flow simulation system to the source web application, an anomaly detected in the plurality of web applications caused by the event.

* * * * *